(12) United States Patent
Nishio

(10) Patent No.: US 7,873,691 B2
(45) Date of Patent: Jan. 18, 2011

(54) NETWORK CONTROL APPARATUS AND METHOD

(75) Inventor: Masahiro Nishio, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1272 days.

(21) Appl. No.: 11/169,578

(22) Filed: Jun. 30, 2005

(65) Prior Publication Data

US 2005/0251569 A1    Nov. 10, 2005

Related U.S. Application Data

(62) Division of application No. 09/859,499, filed on May 18, 2001, now Pat. No. 6,947,964.

(30) Foreign Application Priority Data

May 19, 2000    (JP) ............................. 2000-148891

(51) Int. Cl.
*G06F 15/16* (2006.01)
(52) U.S. Cl. ........................................ 709/202; 709/223
(58) Field of Classification Search ................. 709/202; 358/1.15
See application file for complete search history.

(56) References Cited

U.S. PATENT DOCUMENTS

| 5,887,193 | A   | * | 3/1999  | Takahashi et al. ............... 710/8 |
| 5,960,172 | A   | * | 9/1999  | Hwang ........................ 726/34 |
| 6,631,008 | B2  | * | 10/2003 | Aoki ......................... 358/1.15 |
| 2001/0004745 | A1 | * | 6/2001 | Villalpando ................. 709/223 |

* cited by examiner

*Primary Examiner*—Yves Dalencourt
(74) *Attorney, Agent, or Firm*—Fitzpatrick, Cella, Harper & Scinto

(57) ABSTRACT

A network controller is connected to a peripheral device and to a communication line. The network controller receives a data packet from a management apparatus via the communication line. The network controller identifies a variable to be processed by the network controller and a variable to be processed by the peripheral device in the received data packet. The network controller assembles a data packet with the variable to be processed by the network controller and a data packet with the variable to be processed by the peripheral controller. The network controller sends the data packet with the variable to be processed by the peripheral controller to the peripheral device and causes the peripheral device to process the sent data packet. The network controller processes the data packet with the variable to be processed by the network controller.

8 Claims, 16 Drawing Sheets

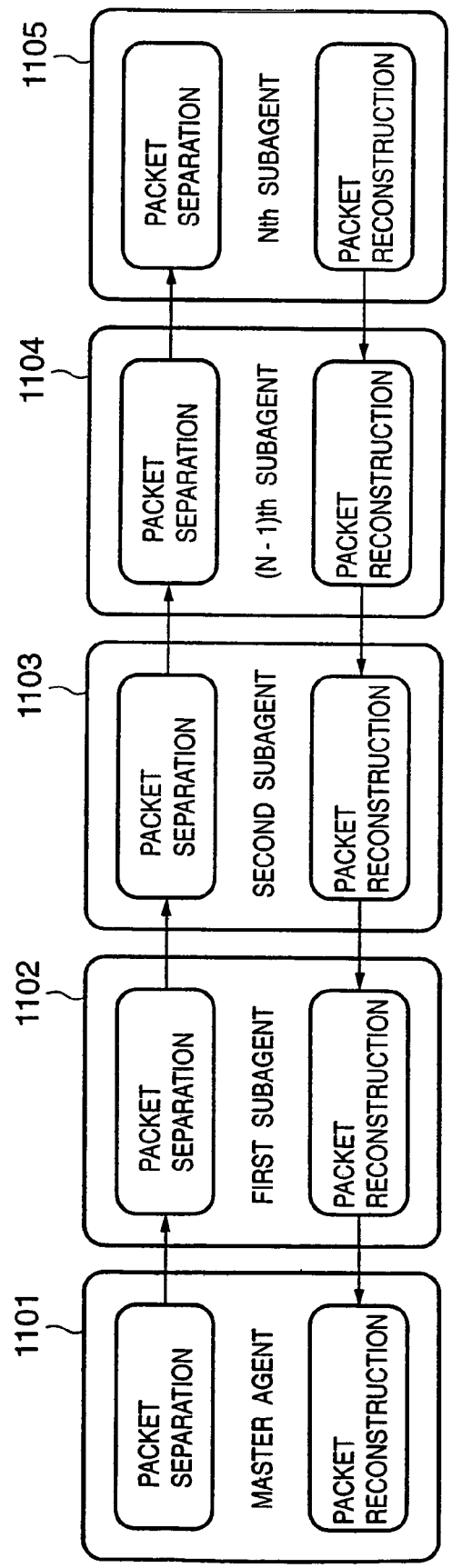

NETWORK CONTROL APPARATUS AND METHOD

This application is a divisional of application Ser. No. 09/859,499, filed May 18, 2001, now U.S. Pat. No. 6,947,964, the contents of which are incorporated by reference herein.

FIELD OF THE INVENTION

This invention relates to a network controller mounted on a network device such as an image processing device having a network communication function, and to a network control method.

BACKGROUND OF THE INVENTION

Image processing devices such as network-capable printers, scanners and copiers are becoming increasingly popular at a rapid rate as network infrastructures are built.

These network-capable image processing devices are classified into two types, namely (1) a type in which a network function is incorporated within the image processing device, i.e., a type in which a network control function (network controller) is incorporated as part of the controller of the image processing device, i.e., and (2) a type in which the network function is incorporated as an extension of the image processing device, i.e., a type in which network support is provided by inserting a control device having a network control function (network controller) into an expansion slot or connector of the image processing device. Both types of image processing devices are so adapted that the peripheral device such as a printer or scanner is connected to the network controller that is connected to the network.

These network-capable image processing devices are required to have not only the original communication function for communicating print data or scan data but also a configuration management function and troubleshooting management function possessed by a network manager, a network information management function and functions for supporting additional functions. The configuration management function is for configuring the network system and managing addresses and resources. The troubleshooting management function is for detecting network system failures, analyzing and reporting the failures and effecting recovery. The network information management function is for performing network management, namely management of network load and management of performance. An example of an additional function is a function for configuring another peripheral processing device connected via the network.

A Simple Network Control Protocol (SNMP) is utilized to implement these functions. Management information in a network device is managed in the form of a database referred to as a Management Information Base (MIB). In SNMP, an SNMP-equipped network manager acquires or sets the values of MIB variables (described later) by an agent which manages each network device. This allows the above-mentioned functions to be implemented.

FIG. 14 is a conceptual view illustrating the structure of an MIB. As shown in FIG. 14, the MIB has a tree-like data structure in which all nodes are uniquely numbered. The numbers in the parentheses in FIG. 14 are node identifiers. For example, the identifier of a node 1401 in FIG. 14 is 1. Since the identifier of a node 1402 is 3 and this is subordinate to node 1401, it is written 1.3. Similarly, the identifier of a node 1403 is written 1.3.6.1.2. Such an identifier of a node is referred to as an object identifier, and each node is referred to as an MIB variable.

In FIG. 14, a node 1404 is one at the vertex of an object group referred to as a standard MIB with which a device managed by SNMP is equipped as a standard. The details of the structure of an object subordinate to such a node are stipulated in RFC1213 Management Information Base for Network Management of TCP/IP-based Internets: MIB-II.

A node 1405 is one at the vertex of an object group referred to as a printer MIB with which a printer managed by SNMP is equipped as a standard. The details of the structure of an object subordinate to such a node are stipulated in RFC1759 Printer MIB.

A node 1406, which is referred to as a private MIB, is one at a vertex where an enterprise or organization, etc., defines its own MIB. A node 1407, which is referred to as enterprise extension MIB, is one at a vertex where an enterprise among private MIBs implements its own extension. For example, "1602" is assigned to Canon, Inc. as an enterprise number in order that it may define itself. A node 1408, which is a vertex for defining Canon MIB as Canon's own MIB, is situated under the node 1407 signifying an enterprise. The object identifier of the vertex node of Canon MIP is 1.3.6.1.4.1.1602.

An agent is incorporated within an image processing device that is a network device or is mounted on a network controller externally connected to the image processing device. A network controller is an externally attached network interface card, by way of example. The management information (MIB) also is managed by the network controller. If a network device is an image processing device having multiple functions, the database of the MIB of the peripheral device connected to this network device, e.g., the database of a printer MIB or host-resource MIB, also is managed in the network controller.

By virtue of this arrangement, a network device can be made the object of management by an SNMP-equipped network manager. In accordance with SNMP, a network manager can acquire information concerning, or change the status of, a controlled network device belonging to the same community as that of the network manager. For example, a network manager can send a network device a message containing desired MIB variables, can acquire a character string being displayed on the liquid crystal display device of a printer, and can change the default paper-feed cassette.

In such case the network controller in the network device that has received a message analyzes the content of the message. If the content of the message is acquisition of information specific to the peripheral device connected to the network controller, then the network controller acquires information from the pertinent peripheral device via a specific communication interface between itself and the peripheral device. The network controller further converts the acquired information to a format decided by SMNP and then responds to the network manager.

Thus, in the prior art, the network controller must manage also the MIB of the peripheral device that is connected to it. For example, in a case where a plurality of peripheral devices have been combined, as in the manner of a printer and scanner, all of the MIBs relating to these peripheral devices must be managed by the network controller.

Consequently, in a case where a single network controller is capable of being connected to multiple peripheral devices, it is required that the network controller manage all of the MIBs relating to these peripheral devices. For example, there are instances where a network controller is connectable to different model printers A and B, and there are occasions where a network controller is connectable to a printer, scanner and facsimile machine all of which provide different functions. In such cases it is required that all of the MIBs relating to the connectable peripheral devices be managed by the network controller. A problem which arises is that the network controller needs to be furnished with a very large-capacity memory in order to store these databases.

Another problem is that since communication interfaces between the network controller and the peripheral devices connected to it are specific to the peripheral devices, the network controller must support all of these communication interfaces.

If in such case a peripheral device connectable to a network controller is added on anew, the network controller itself or the control software executed by the network controller must be updated in order to support the interface between the network controller and the new peripheral device.

SUMMARY OF THE INVENTION

Accordingly, an object of the present invention is to provide a network controller that does not need to be equipped with a large-capacity memory to store a management information database.

Another object of the present invention is to provide a network controller in which it is unnecessary to support a plurality of different communication interfaces for communicating with respective ones of a plurality of peripheral devices.

A further object of the present invention is to provide a network controller in which when a peripheral device is newly added onto the network controller, the added peripheral device can be supported merely by adding on a subagent that controls the management information on the side of the peripheral device.

According to the present invention, the following objects are attained by providing a network device connected to a network and having a plurality of controllers, comprising: a plurality of databases disposed in distributed fashion on respective ones of the plurality of controllers and storing management information relating to respective ones of the controllers; and a plurality of agents distributed on the plurality of controllers; wherein each of the plurality of agents has means for communicating with one another, means for executing distributed processing of messages issued from a network manager, and means for generating responses to these messages.

Preferably, at least one agent among the plurality thereof functions as a master agent and the other agents function as subagents, and each of the agents communicates with one another using a network manager that manages the network, a protocol for management information exchange between the network manager and the network device.

Preferably, the master agent has means for separating a message issued from a network manager into a first message containing management information to be processed by the master agent, and a second message containing management information other than this management information; response generating means for generating response information with regard to the first message; and means for notifying subagents of the second message.

Preferably, the master agent has means for receiving response messages sent back from the subagents; reconstruction means for reconstructing a response message, which is to be sent back to the network manager, from the response messages and the response information that has been generated by the response generating means; and means for sending the response message, which has been reconstructed by the reconstruction means, back to the network manager.

Preferably, each subagent has means for separating a second message, which has been received from the master agent, into a third message containing management information to be processed by the subagent and a fourth message containing management information other than this management information; response generating means for generating response information with regard to the third message; and means for notifying other subagents of the fourth message.

According to another aspect of the present invention, there is provided a network controller connected to a peripheral device and to a communication line, comprising: receiving means for receiving data from a management apparatus via the communication line; discriminating means for discriminating the data, which has been received by the receiving means, as data to be processed by the network controller and data to be processed by the peripheral device; and processing means for sending the peripheral device, and causing the peripheral device to process, data that the discriminating means has discriminated as being data to be processed by the peripheral device, and for processing data that the discriminating means has discriminated as being data to be processed by the network controller.

The network controller preferably further comprises holding means for holding information relating to the network controller, wherein the processing means processes the data using the information held by the holding means.

The network controller preferably further comprises connecting means capable of being connected to a plurality of peripheral devices, wherein the discriminating means discriminates, with regard to each connected peripheral device, data to be transmitted to and processed by the peripheral device.

Preferably, a peripheral device connected to a communication line via the network controller comprises: receiving means for receiving data from a management apparatus via the network controller; and processing means for processing data, which has been received by the receiving means, upon referring to a database holding information relating to the peripheral device.

According to another aspect of the present invention, there is provided a network device connected to a communication line and including a network controller and a peripheral processing unit, the network controller having receiving means for receiving data from a management apparatus via the communication line; discriminating means for discriminating the data, which has been received by the receiving means, as data to be processed by the network controller and data to be processed by the peripheral processing unit; and first processing means for sending the peripheral processing unit, and causing the peripheral processing unit to process, data that the discriminating means has discriminated as being data to be processed by the peripheral processing unit, and for processing data that the discriminating means has discriminated as being data to be processed by the network controller; and the peripheral processing unit has receiving means for receiving data that the discriminating means has discriminated as being data to be processed by the peripheral processing unit; and second processing means for processing data, which has been received by the receiving means, upon referring to a database holding information relating to the peripheral processing unit.

Preferably, the network controller further has holding means for holding information relating to the network controller per se, wherein the first processing means processes the data using the information held by the holding means.

Preferably, the network controller further has connecting means capable of being connected to a plurality of peripheral processing units, wherein the discriminating means discriminates, with regard to each connected peripheral processing unit, data to be transmitted to and processed by the peripheral processing unit.

According to another aspect of the present invention, there is provided a device controller externally connected at two ends, comprising a database; means which, if a message received from upstream contains management information corresponding to an entry in the database, is for generating response information by processing the management information in accordance with the message; means which, if the message contains other management information, is for generating a second message containing this management information and transmitting the second message downstream; and means for reconstructing a response message by combining the response information with the second message received from downstream, and transmitting the response message upstream.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a diagram showing an arrangement having one master agent and N-number of subagents;

DESCRIPTION OF THE PREFERRED EMBODIMENTS

First Embodiment

<Network Configuration>

Figure 12:
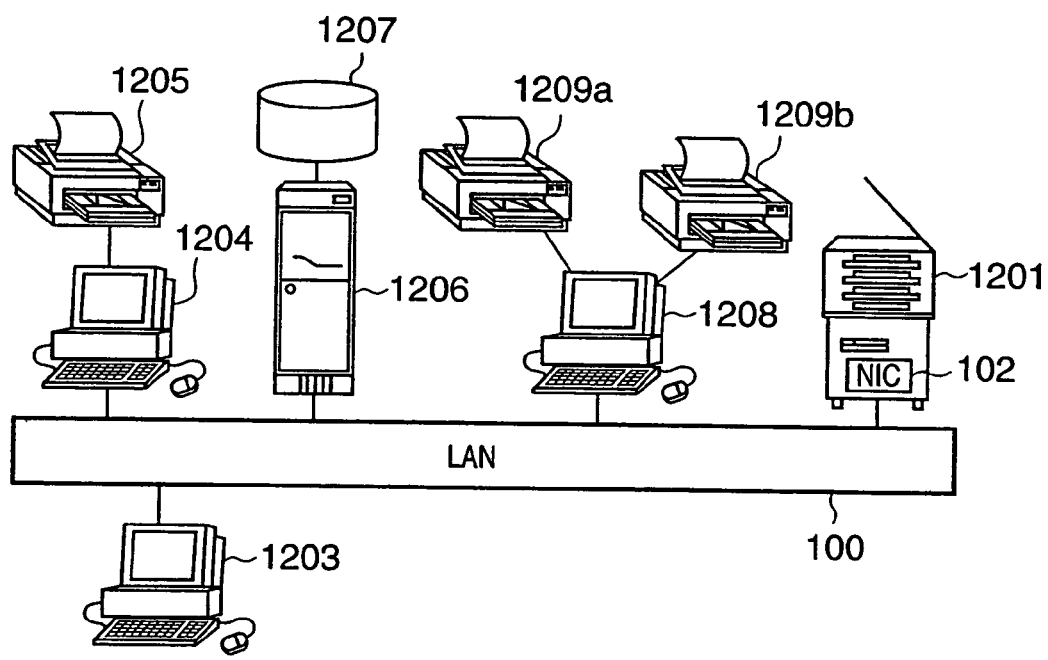
FIG. 12 is a diagram illustrating an example of the configuration of a network system in an embodiment of the invention.

FIG. 12 illustrates an example of a network that includes a printer 1201 connected to the network by a network controller in accordance with the present invention.

The network, which has an open architecture, has the printer 1201 connected thereto by a network interface card (NIC) 102. The network interface card 102 is connected to a local area network (LAN) 100 via a LAN interface such as an Ethernet interface 10Base-2 having a coaxial connector or a 10Base-T having an RJ-45 connector. The printer 1201 and NIC 102 may be separated or integrated. In this embodiment, the NIC 102 shall also be referred to as a network controller 102.

A plurality of personal computers such as 1203 and 1204 also are connected to the LAN 100 and are capable of communicating with the NIC 102 under the control of a network operating system. One of the personal computers, say personal computer 1203, can be used as an SNMP-equipped network manager (SNMP manager).

Further, a file server 1206 is connected to the LAN 100 and manages access to files that have been stored in a large-capacity (e.g., 10 GB) network disk 1207. A printer server 1208 manages printing performed by locally connected printers 1209a, 1209b or printing performed by a remote printer 1205. Other peripherals (not shown) also may be connected to the LAN 100.

The personal computers 1203 and 1204, which are implemented by ordinary personal computers, can each generate data files, transmit the generated data files to the LAN 100, receive files from the LAN 100 and display such files and/or subject them to processing.

<Structure of Printer 1201>

Figure 13:
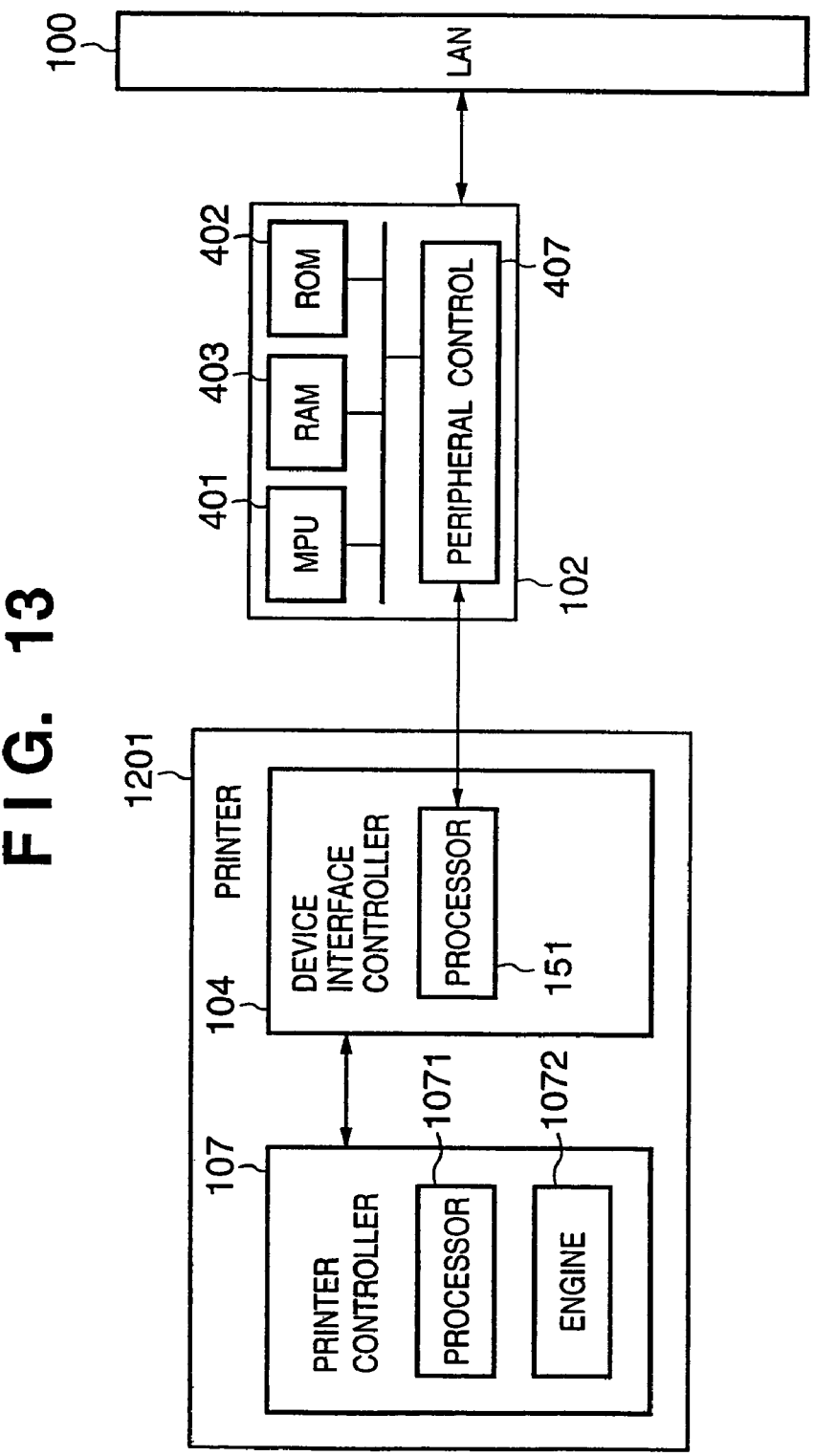
FIG. 13 is a block diagram of a network device in this embodiment.

FIG. 13 is a block diagram showing how the NIC 102, printer 1201 and LAN 100 are connected. According to this embodiment, the printer 1201 is connected to the LAN 100 via the NIC 102, which is the network controller. The NIC 102 is connected to the LAN 100 via a LAN interface and to the printer 1201 via a device interface controller (referred to simply as an I/F controller) 104. Provided on the NIC 102 and interconnected via an internal bus are a microprocessor 401 for controlling the NIC 102, a ROM 402 for storing the operating program of the microprocessor 401, a RAM 403 used as a work area when the microprocessor 401 executes a program, and a peripheral control 407 through which the NIC 102 and I/F controller 104 exchange data. A program whereby the NIC 102 operates as an SNMP agent (a master agent, described later) has been stored in the ROM 402. The microprocessor 401 operates in accordance with the program stored in the ROM 402 and uses the RAM 403 as a work area.

A microprocessor 151 in the I/F controller 104 accesses data in the NIC 102 via the peripheral control 407 provided in the NIC 102. The microprocessor 151 in the I/F controller 104 controls the operation of a printer controller 107.

The printer controller 107, which has a printer engine 1072, controls the printer engine 1072 using the microprocessor 1071 and implements the function of a subagent, described later.

<Structure of Agent in Printer 1201>

Figure 1:
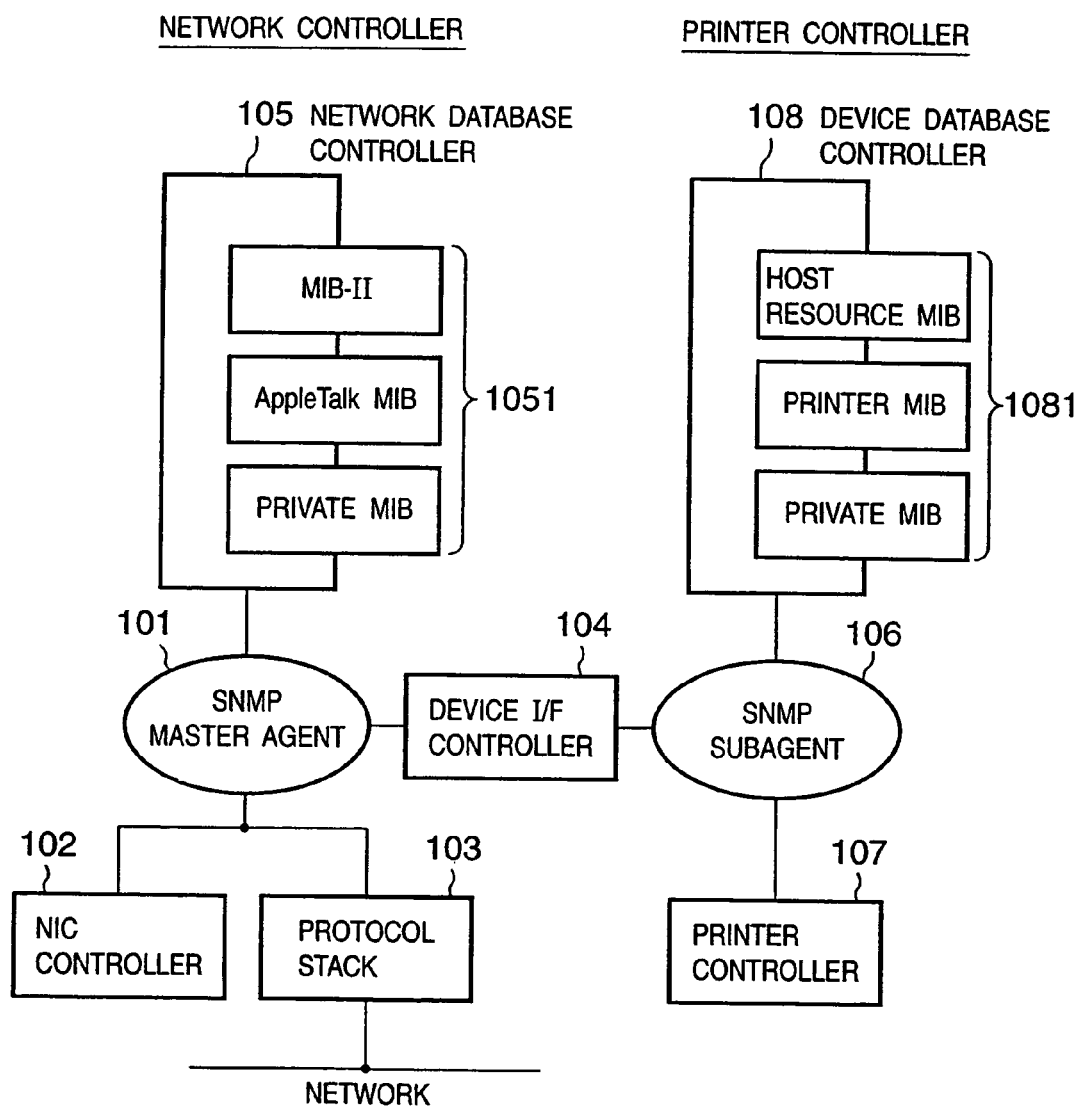
FIG. 1 is a diagram illustrating an arrangement of a master agent and subagent.

FIG. 1 is a diagram showing a functional structure that best expresses the characterizing features of the SNMP master agent in the network controller 102 of the present invention and the characterizing features of the subagent in the printer 1201. The network controller 102 and printer controller 107 are connected via the device interface controller 104. A master agent 101 executes processing in the network controller and a subagent 106 executes processing in an image processing device, which here is the printer controller 107. In FIG. 1, the left side of the image processing device interface controller 104 is the master agent (network controller) and the right side is the subagent (image processing device).

In FIG. 1, the SNMP master agent 101 is placed in the network controller 102. The lower-order layer of the SNMP master agent is constituted by the NIC controller 102, a protocol stack 103, the device I/F controller 104, and a network database controller 105 for managing network information. In this embodiment, the SNMP master agent 101 manages an MIB-II, an AppleTalk MIB and, among vendor-specific private MIBs, an MIB object relating to communication control (a management information MIB object). These MIBs shall be referred to collectively as an MIB database 1051.

The MIB-II includes groups referred to as a "system" group, which provides generally settings information, and an "interface" group, which indicates types of network interfaces, etc. An object identifier is assigned to each of these groups as well. The AppleTalk MIB is an object for providing information and setting parameters relating to AppleTalk, which is one network system. The private MIB has content which, say, the manufacturer of the NIC 102 itself assigns to the NIC.

The SNMP subagent 106 is placed in the image processing device (here a printer). In this embodiment, the SNMP subagent 106 is placed in the printer controller 107. The lower-order layer of the SNMP subagent 106 is constituted by the printer controller 107, the device I/F controller 104, and a device database controller 108 for managing a database required in the printer. In this embodiment, the SNMP subagent 106 manages a host resource MIB, a printer MIB and, among vendor-specific private MIBs, an MIB object relating to the printer.

The printer MIB is an object for providing general information relating to the printer. The private MIB includes content which, say, the manufacturer of the printer itself assigns to the NIC. The host resource MIB provides information concerning resources of a host computer.

The MIB objects managed by the database controllers 105, 108 in the network controller 102 and printer controller 107, respectively, are objects that are capable of being managed by an SNMP manager. Since each MIB object corresponds to a resource possessed by a network device, the SNMP manager can manage each of these network resources in accordance with SNMP. These groups of MIBs shall be referred to collectively as MIB databases.

<Agent Structure>

Figure 2:
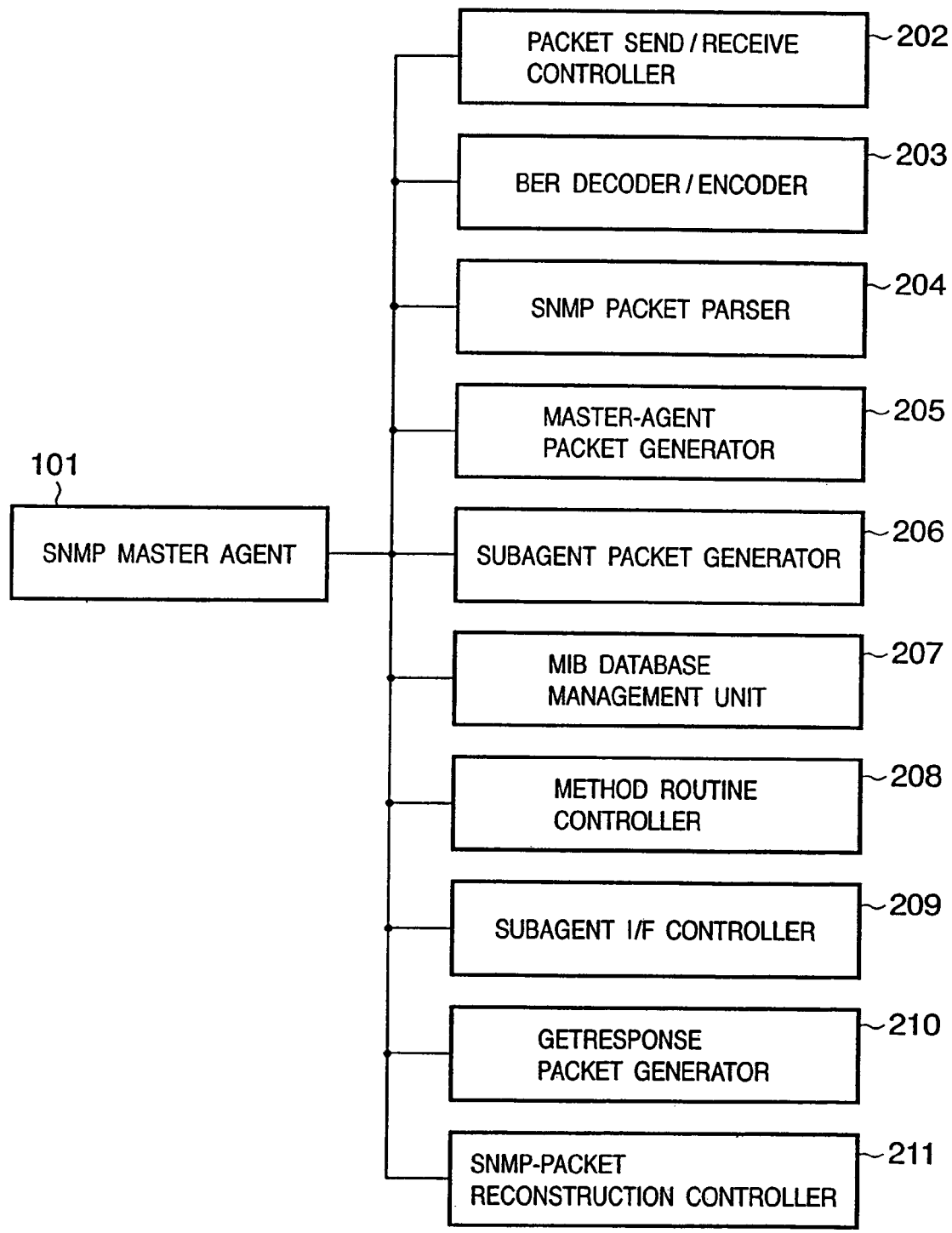
FIG. 2 is a diagram illustrating the software module structure of a master agent.

FIG. 2 is a diagram illustrating the software module structure of the SNMP master agent 101. The blocks constructing the SNMP master agent 101 will now be described. Specifically, a packet send/receive controller 202 controls the sending and receiving of SNMP packets to and from the protocol stack. A BER decoder/encoder 203 executes the decoding of encoded receive SNMP packets and the encoding of transmit packets. An SNMP packet parser 204 analyzes the content of SNMP packets. A master-agent packet generator 205 separates the content of a packet into packets for the master agent. A subagent packet generator 206 separates the content of a packet into packets for a subagent. An MIB database management unit 207 manages an MIB object ID, which is detected by the SNMP packet parser 204, and mapping information of a processing module corresponding to this ID. A method routine controller 208 controls a method routine group prepared for each object. A subagent I/F controller 209 controls communication with a subagent. A GetResponse packet generator 210 generates a response packet processed by the master agent 101. An SNMP-packet reconstruction controller 211 reconstructs an SNMP packet, which is to be sent back to the network information manager, from a GetResponse packet of the master agent and a GetResponse packet that has been sent back from a subagent.

Figure 3:
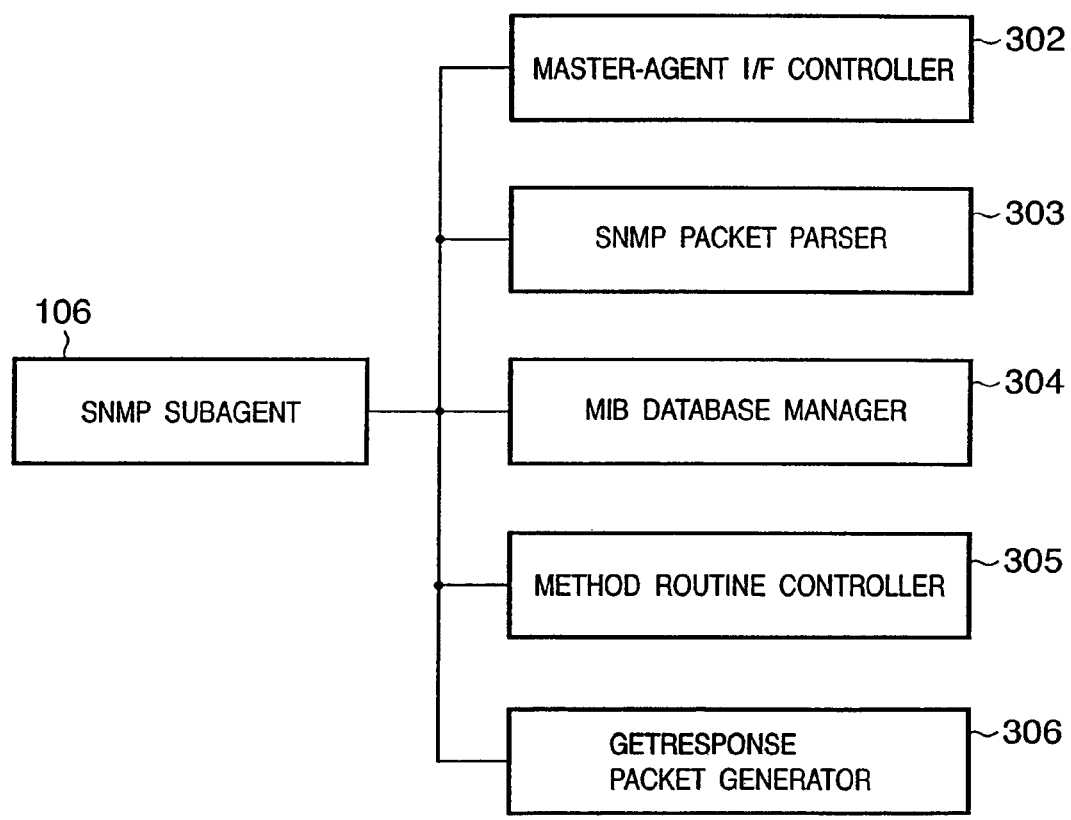
FIG. 3 is a diagram illustrating the software module structure of a subagent.

FIG. 3 is a diagram illustrating the software module structure of the SNMP subagent 106. The blocks constructing the SNMP subagent 106 will now be described. Specifically, a master-agent I/F controller 302 controls the sending and receiving of SNMP packets to and from the master agent 101. An SNMP packet parser 303 analyzes the content of SNMP packets received from the master agent. An MIB database management unit 304 manages an MIB object ID, which is detected by the SNMP packet parser 303, and mapping information of a processing module corresponding to this ID. A method routine controller 305 controls a method routine group prepared for each object. A GetResponse packet generator 306 generates a response acquisition packet processed by the subagent 106.

<Hardware Structure of Network Controller>

Figure 4:
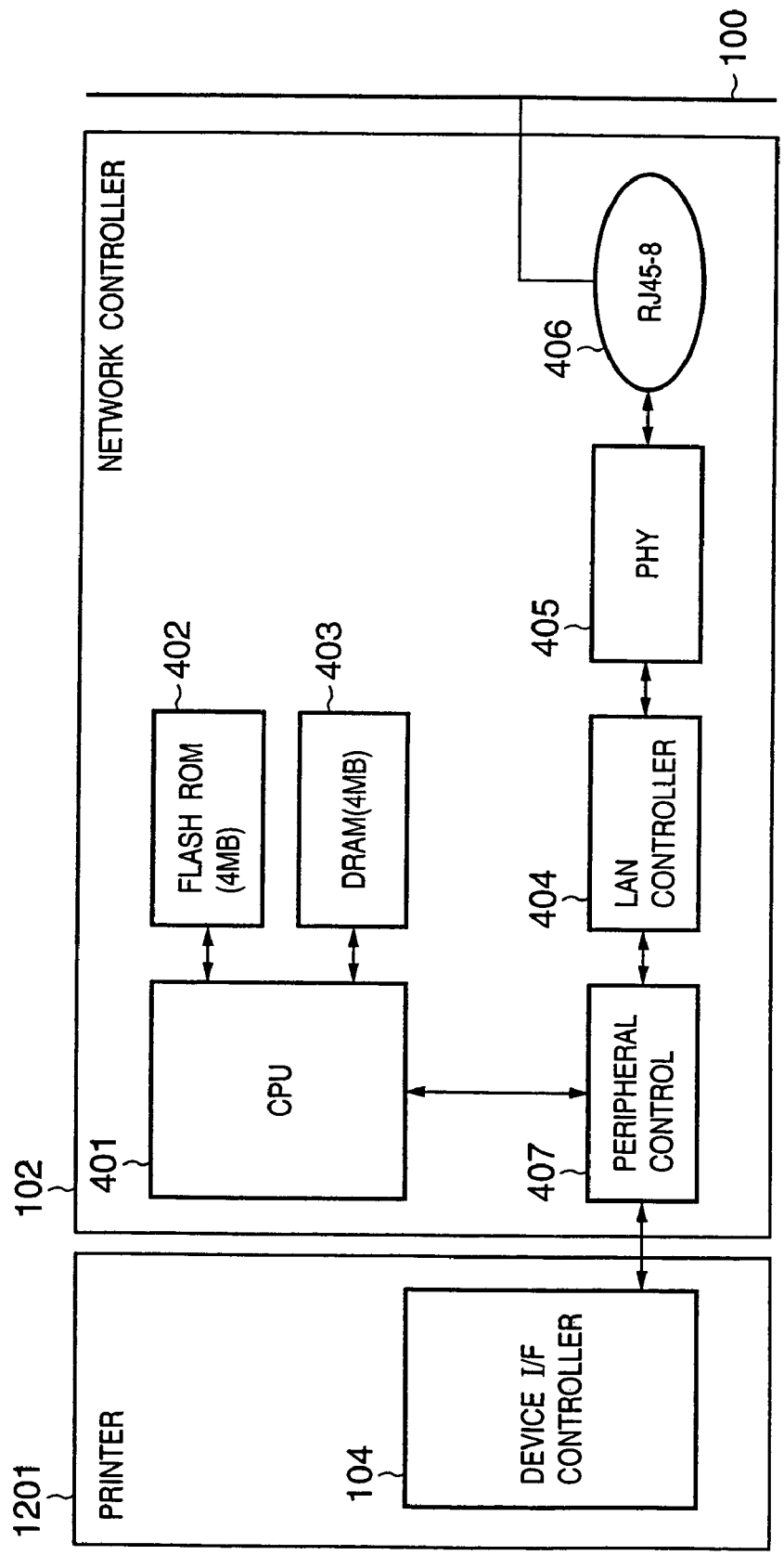
FIG. 4 is a diagram illustrating the hardware structure of a network controller.
Figure 5:
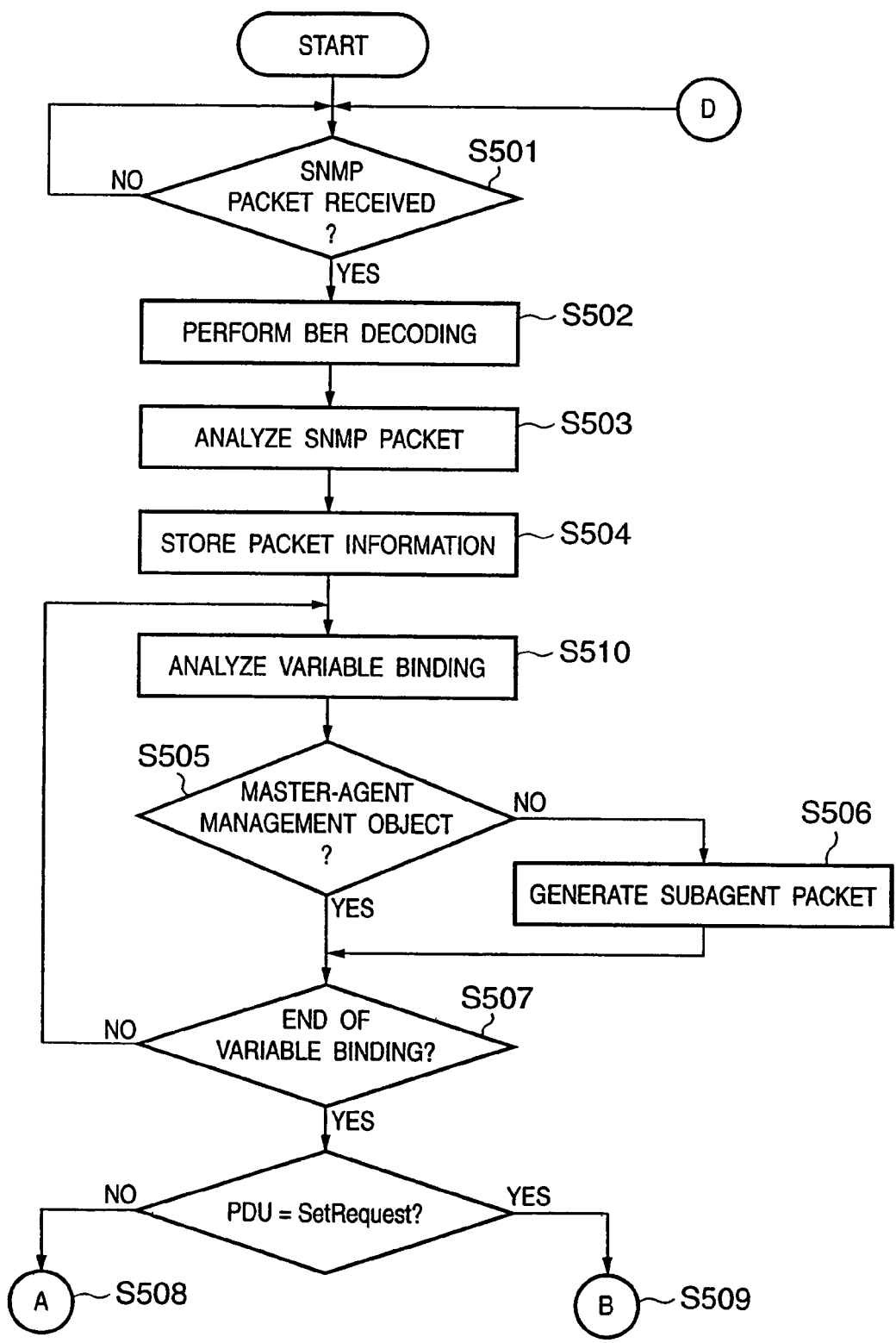
FIG. 5 is a flowchart illustrating the flow of control of network management information.

FIG. 4 illustrates the hardware structure of the network controller 102 according to this embodiment. A 32-bit RISC chip is used as the CPU 401 according to this embodiment. However, this does not impose a limitation upon the invention and any type of CPU may be used. A flash ROM 402 holds program execution code and a database that includes an MIB managed by the network database controller 105. An area that is part of the ROM 402 is used as a non-volatile memory area and is utilized to store parameter data and configuration information, etc., that has been set by the user.

A RAM 403 is used as a work area. In this embodiment, execution code and a database table that have been stored in the flash ROM 402 are copied to the RAM 403 at start-up. Execution of the program code begins when the copying operation is completed.

A LAN physical layer controller (PHY) 405 is connected to Ethernet via a connector 406. A LAN controller 404, which is of the bus-master type, acquires the bus privilege by arbitration with the CPU 401 using send/receive as the event trigger. The LAN controller 404 executes send/receive of data, independently of the CPU 401, in a send/receive buffer reserved in the RAM 403.

The peripheral control 407, which is an ASIC for controlling communication with a peripheral device such as a printer, has a 32-KB dual-port RAM. The arrangement is such that data is communicated with the peripheral device via the device I/F controller 104 using this DPRAM memory area.

This embodiment is described taking a printer as the example of a peripheral device connected to the network. As described in FIG. 13, the hardware structure of the printer is a CPU, ROM, RAM structure, similar to that of the network controller 102., and has an arrangement (not shown) that is independent of the control system on the side of the communication controller. In addition to this arrangement, the printer is equipped with resources, e.g., a printer engine, for performing a function specific to the printer. The CPU executes a predetermined program, thereby controlling these resources and implementing an SNMP subagent.

The software that controls the master agent shown in FIG. 2 is stored in the flash ROM 402 of FIG. 4, and the software for controlling the subagent is stored in a ROM on the side of the device interface controller 104, which is the peripheral device.

<Packet Processing by Agent>

The control flow of software that has been stored in each of these ROMs will now be described.

FIG. 5 and FIGS. 7 to 10 illustrate the control flow of a master agent and subagent in a network controller according to this embodiment.

An SNMP packet issued from the SNMP manager 1203 on the network is received by the packet send/receive controller 202 of the master agent (step S501). Since the SNMP packet has been encoded in accordance with the BER stipulation, it is decoded in the BER decoder/encoder 203 of the master agent (step S502). The decoded SNMP packet is analyzed in the SNMP packet parser 204 in accordance with the definition in ASN.1 (step S503). The SNMP master agent 101 obtains the version, community, PDU type, request ID and variable binding from this packet (step S504).

Figure 6:
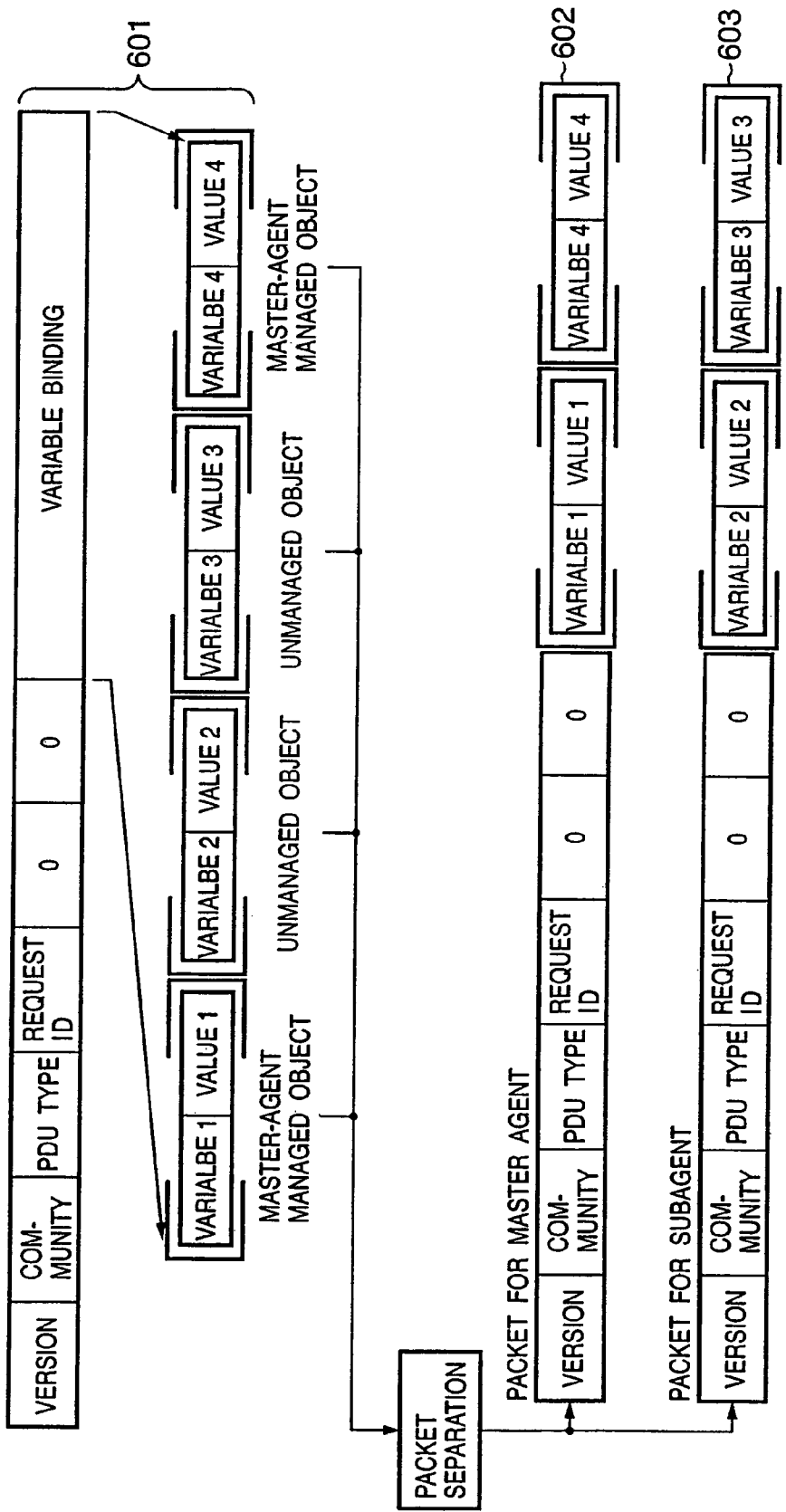
FIG. 6 is a diagram illustrating a procedure for analyzing a variable binding.

FIG. 6 is a diagram illustrating the format of a packet (referred to as PDU: Protocol Data Unit) used by SNMP as well as a procedure for analyzing a variable binding 601. The packet includes the SNMP version, the community indicating the group constituted by the SNMP manager and agent, the PDU type indicating the type of PDU of the packet, the request ID, which is used for comparing a request and response, and the variable binding 601, which specifies objects and the values thereof. The variable binding 601 is obtained by combining one to a plurality of elements in each of which the MIB object identifier (variable name) and the value thereof constitute a set.

The variable binding 601 is analyzed in the SNMP packet parser 204 (step S510). If the result of analysis is that a variable name N not being managed by the MIB on the side of the master agent has been detected in the variable binding 601 ("NO" at step S505), the position Nx of the variable name is stored and the variable name is deleted from the packet.

The deleted variable N and its value Nv are packetized again, as an object to be processed on the side of the subagent, in the form of a subagent SNMP packet in subagent packet generator 206 based upon the previously stored version, community, PDU type and request ID information (step S506).

Figure 14:
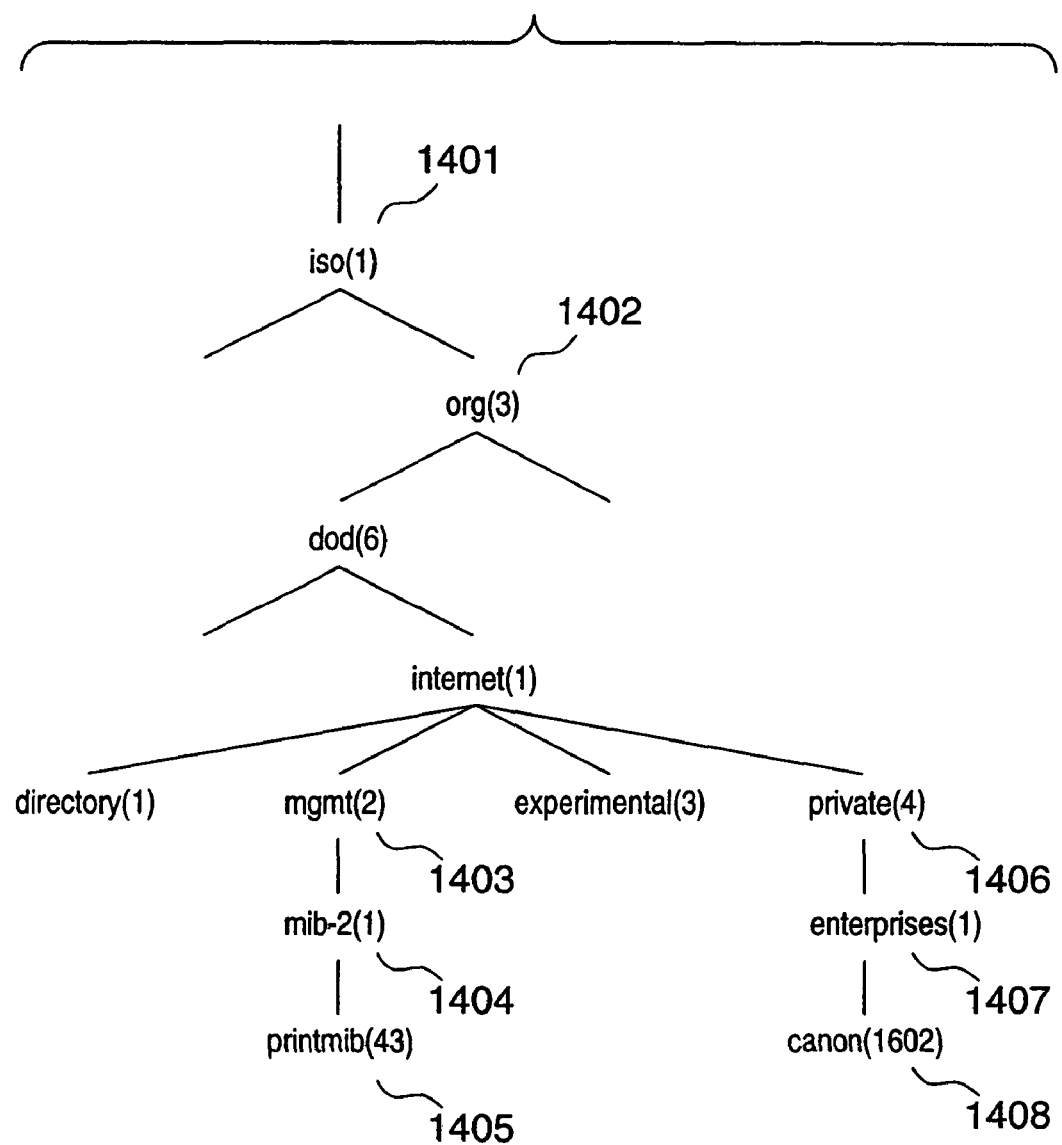
FIG. 14 is a diagram showing an MIB tree structure.

Since variable names are given in a hierarchical structure, as shown in FIG. 14, matching with variable names in an MIB is easy to perform. The SNMP manager manages an MIB, which the agent of each network device manages by an MIB view, and accesses only a variable that is being managed by the MIB view. Accordingly, a variable which is contained in the variable binding but which is not being managed by the master agent is judged by the master agent to be an MIB that is being managed by a subagent.

On the other hand, a variable being managed by a master agent is processed by the master agent and therefore the variable is packetized anew by the master-agent packet generator 205. As a result, variables (objects) managed by the master agent are reconstructed into a master-agent packet 602, and variables (objects) not managed by the master agent are reconstructed into a subagent packet 603, as shown in FIG. 6. With regard to fields other than the variable binding, fields other than those to be changed by packet reconstruction are maintained as is, which is the case with packet length. Control after separation of a packet into the master-agent and subagent packets differs depending upon the PDU type (step S507). That is, a process A (FIGS. 7A, 7B and 8) is executed (step S508) if the PDU type is GetRequest/GetNextRequest, and a process B (FIGS. 9A, 9B and 10) is executed (step S509) if the PDU type is SetRequest.

<Processing of GetRequest Packet>

Figure 7A:
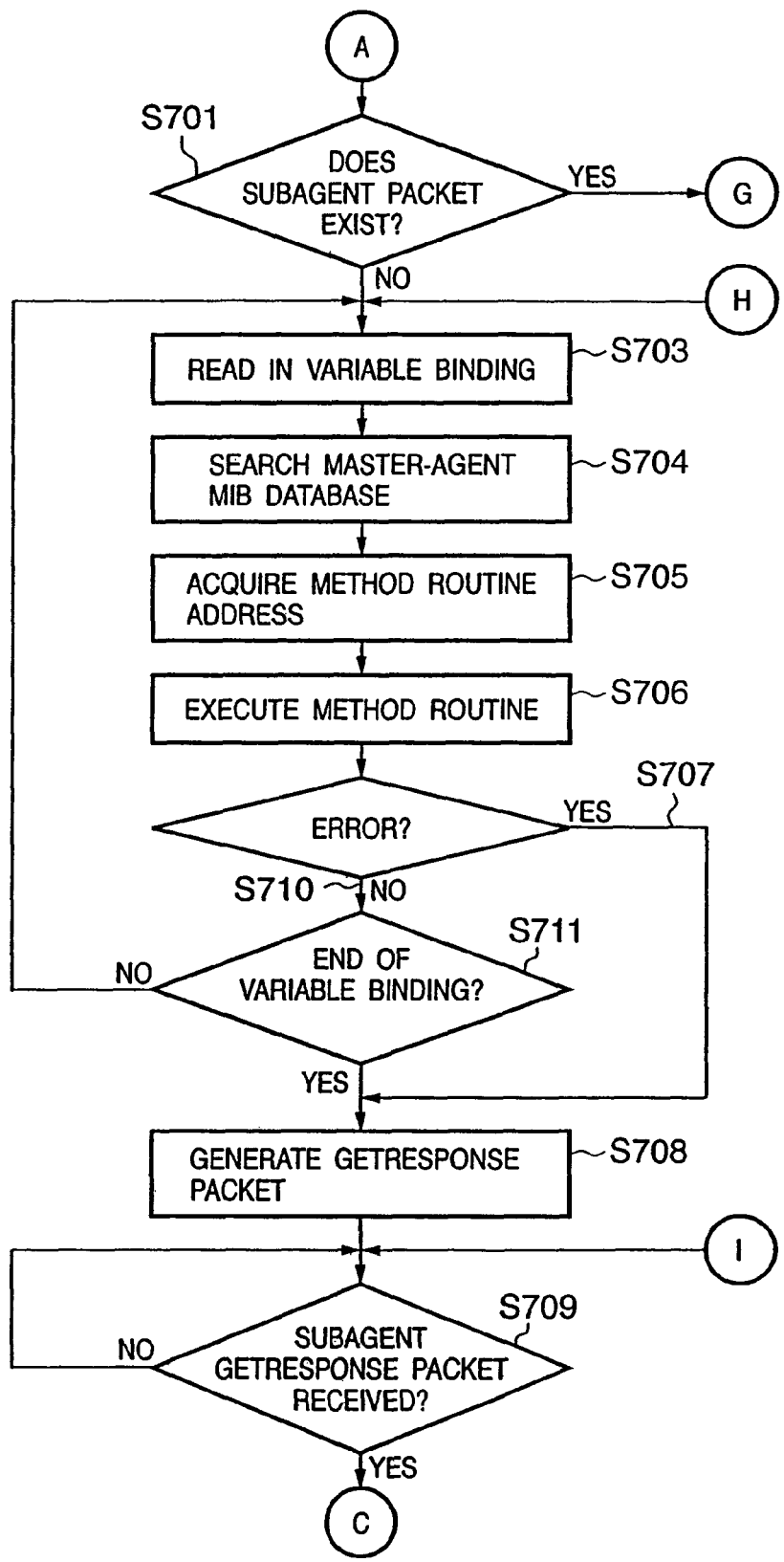
FIGS. 7A and 7B are flowcharts illustrating control flow of a process A.
Figure 7B:
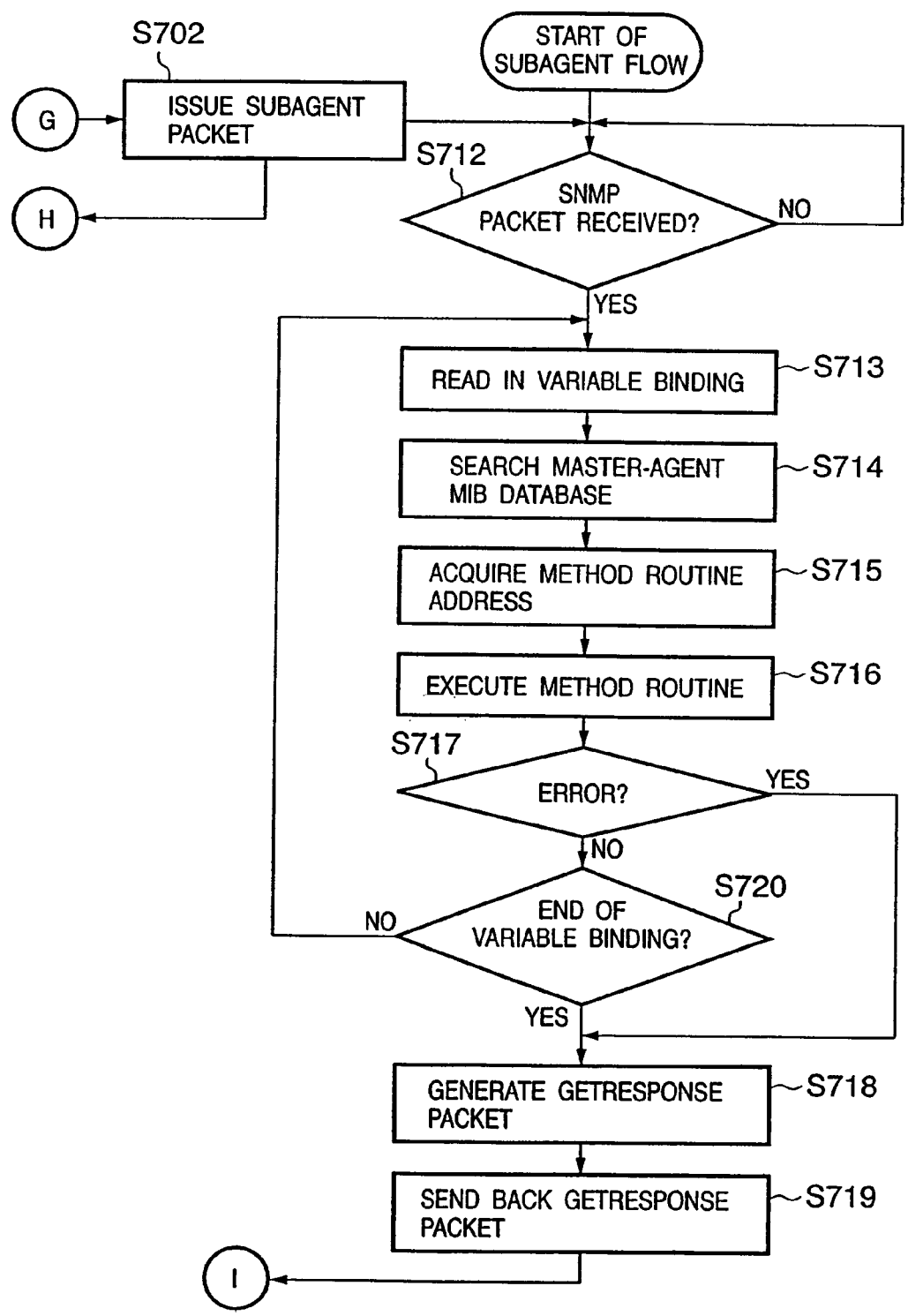

FIGS. 7A. 7B and 8 are flowcharts for describing the control flow of process A. The master agent determines whether a packet to be issued to a subagent exists (step S701). If the decision rendered is "YES", a subagent SNMP packet generated by the subagent packet generator 206 is issued to the subagent via the subagent I/F controller 209 (step S702).

The master agent successively reads out variable-and-value combinations in the variable binding of the master-agent SNMP packet (step S703), searches the MIB database 1051 using the MIB database management unit 207 (step S704), acquires address information of an address at which a method routine corresponding to a variable has been stored (step S705) and subsequently executes the relevant processing in the method routine controller 208 based upon this address information (step S706).

If notification of abnormal end is received from the method routine controller 208 after execution of the above-described processing (step S707), processing is suspended without waiting for completion of execution of the overall variable binding, the GetResponse packet generator 210 is notified of the error status and index value, a GetResponse packet is generated (step S708) and the master agent then waits for issuance of a GetResponse from the subagent side (step S709).

On the other hand, if notification of normal end is received from the method routine controller 208 (step S707), processing identical with that of steps S703 to S706 is applied to the next combination of variable and value. The same processing is executed until the end of the variable binding list is reached (step S711).

If a packet has not been issued to a subagent, there will be no response from a subagent and therefore the master agent need not wait for a packet at step S709. The same holds true for step S1006 in FIG. 10A. Further, if a master-agent management object is not contained in a packet received from the SNMP manager, there is no processing to be executed at steps S704 to S711. In such cases, therefore, the master agent either generates a packet having a header only or does not generate a packet at all at step S708. The same holds true for step S1021 in FIG. 10A as well.

If an error does not occur, the master agent generates a GetResponse packet (step S708) upon the completion of all processing and waits for issuance of a GetResponse from the subagent side (step S709).

On the side of a subagent that has a subagent SNMP packet via the master-agent I/F controller 302 ("YES" at step S712), the subagent, in a manner similar to the master agent, successively reads out variable-and-value combinations in the variable binding of the subagent SNMP packet (step S713), searches the MIB database 1081 using the MIB database management unit 304 (step S714), acquires address information of an address at which a method routine corresponding to a variable has been stored (step S715) and subsequently executes the relevant processing in the method routine controller 305 based upon this information (step S716).

If notification of abnormal end is received from the method routine controller 305 after execution of the above-described processing ("YES" at step S717), processing is suspended without waiting for completion of execution of the overall variable binding, the GetResponse packet generator 306 is notified of the error status and index value, and a GetResponse packet is generated (step S718).

The generated GetResponse packet is reported to the master agent via the master-agent I/F controller 302 (step S719).

If notification of normal end is received from the method routine controller 208 ("NO" at step S717), processing identical with that of steps S713 to S716 is applied to the next combination of variable and value. The same processing is executed until the end of the variable binding list is reached (step S720). Thereafter, a GetResponse packet is generated in the GetResponse packet generator 306 (step S718).

The generated GetResponse packet is reported to the master agent via the master-agent I/F controller 302 (step S719).

Upon receiving the GetResponse packet from the subagent via the subagent packet generator 206, the master agent combines this packet with the GetResponse packet generated by the master agent to thereby reconstruct the GetResponse packet in the SNMP-packet reconstruction controller 211.

Figure 8:
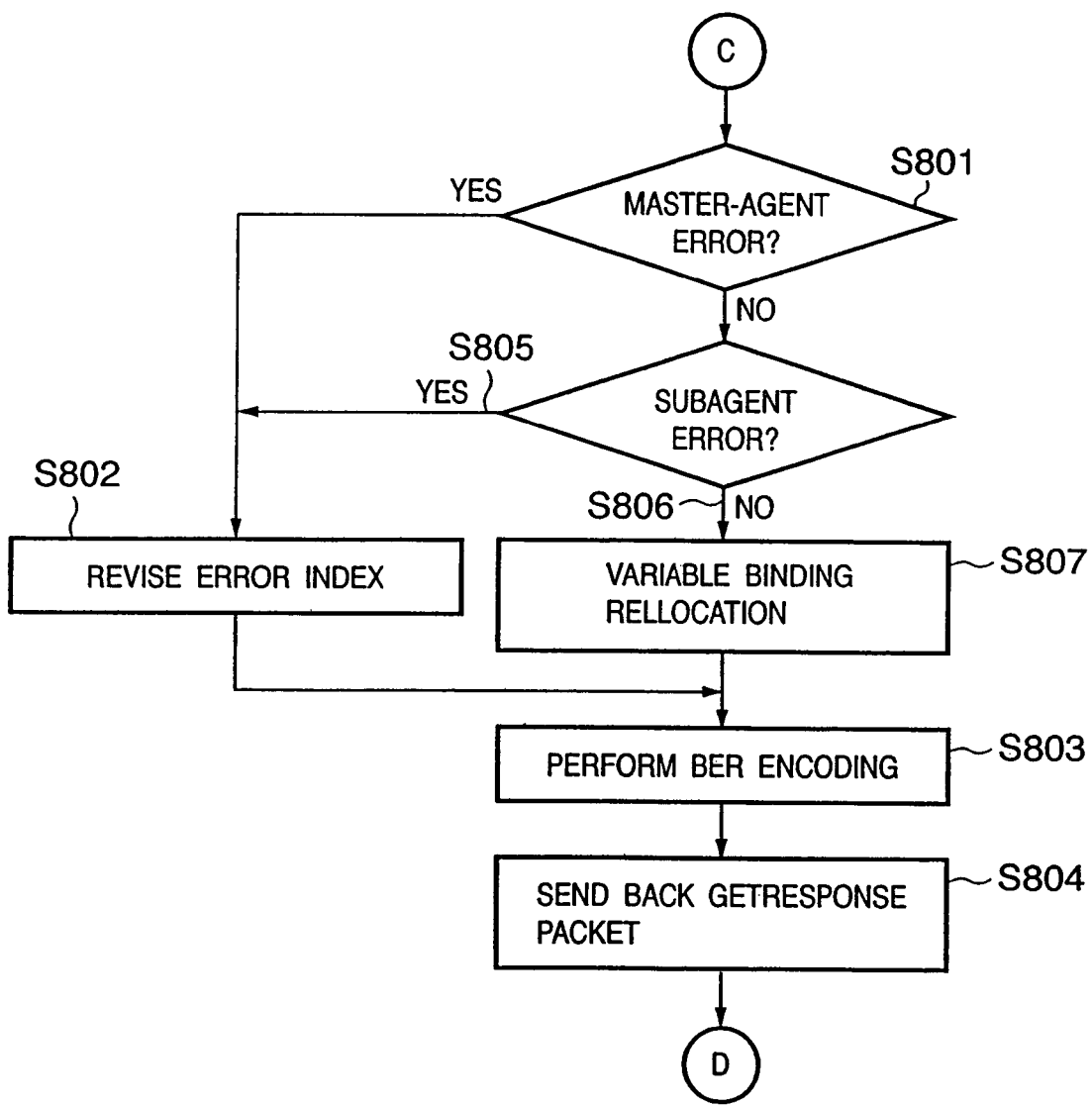
FIG. 8 is a flowchart illustrating packet reconstruction of process A.

FIG. 8 is a flowchart for describing the flow of GetResponse packet reconstruction. Here the master agent checks the content of the error-status fields in the GetResponse packets generated by respective ones of the master agent and subagents.

If the error status of a GetResponse packet that has been generated by the master agent indicates an error ("YES" at step S801), then the value of the error index is converted to the value in the received original packet by the packet reconstruction controller (step S802).

At this time the variable binding is not included in the GetResponse packet in conformity with the atomic rule.

At the moment the conversion processing is completed, BER encoding is performed by the BER decoder/encoder 203 (step S803), after which the GetResponse packet is sent back to the SNMP manager by processing executed in the packet send/receive controller 202.

If the error status of the GetResponse packet received from the subagent indicates an error (step S805), then the value of the error index is converted to the value in the received original packet by the packet reconstruction controller 211 (step S802).

At this time the variable binding is not included in the GetResponse packet in conformity with the atomic rule.

At the moment the conversion processing is completed, BER encoding is performed by the BER decoder/encoder 203 (step S803), after which the GetResponse packet is sent back to the SNMP manager by processing executed in the packet send/receive controller 202 (step S804).

If the error status is indicative of no error for both the master agent and subagent (step S806), the variable bindings in the GetResponse packets of the master agent and subagent are rearranged in an order identical with that of the original packet stored at step S504 and are reconstructed into a single GetResponse packet in the SNMP-packet reconstruction controller 211 (step S807).

The reconstructed GetResponse packet is subjected to BER encoding in the BER decoder/encoder 203 (step S803), after which the GetResponse packet is sent back to the SNMP manager by processing executed in the packet send/receive controller 202 (step S804).

The process A regarding packets for which the PDU type is GetRequest/GetNextRequest is completed through the processing described above, after which the system again waits for receipt of an SNMP packet from the SNMP manager.

<Processing of SetRequest Packet>

Figure 9:
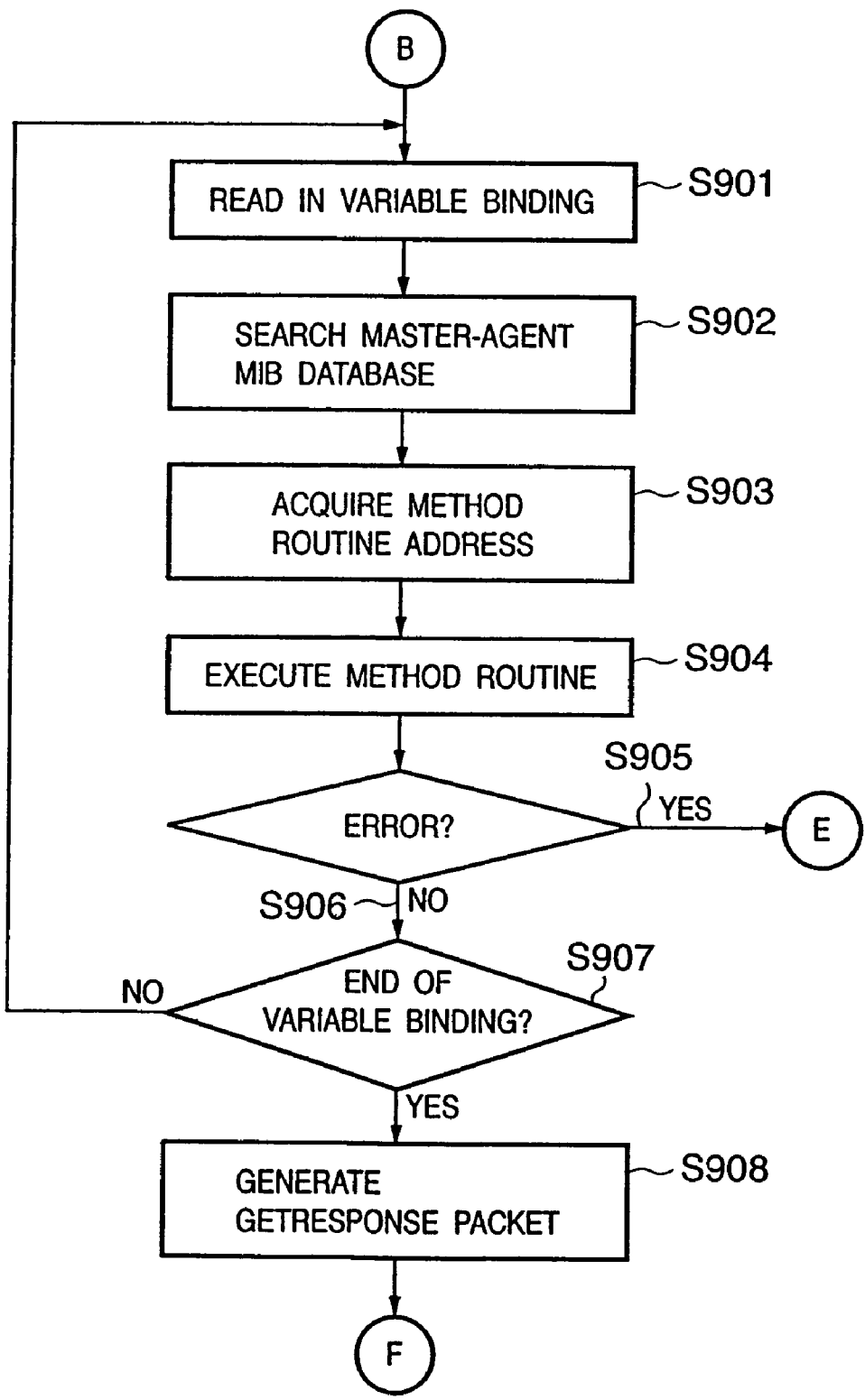
FIG. 9 is a flowchart illustrating control flow of a process B.
Figure 10A:
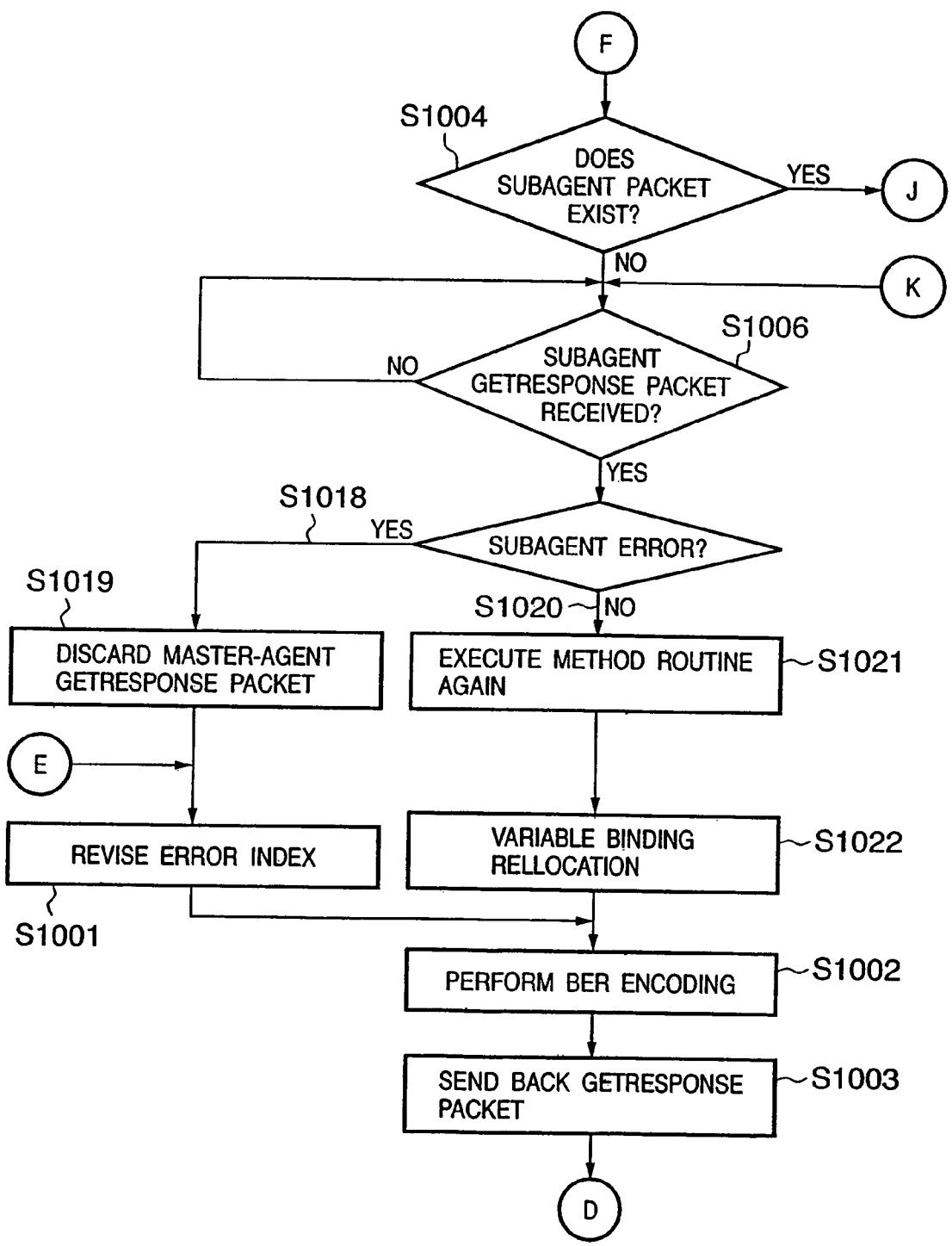
FIGS. 10A and 10B are flowcharts illustrating control after receipt of process-B response acquisition packet.
Figure 10B:
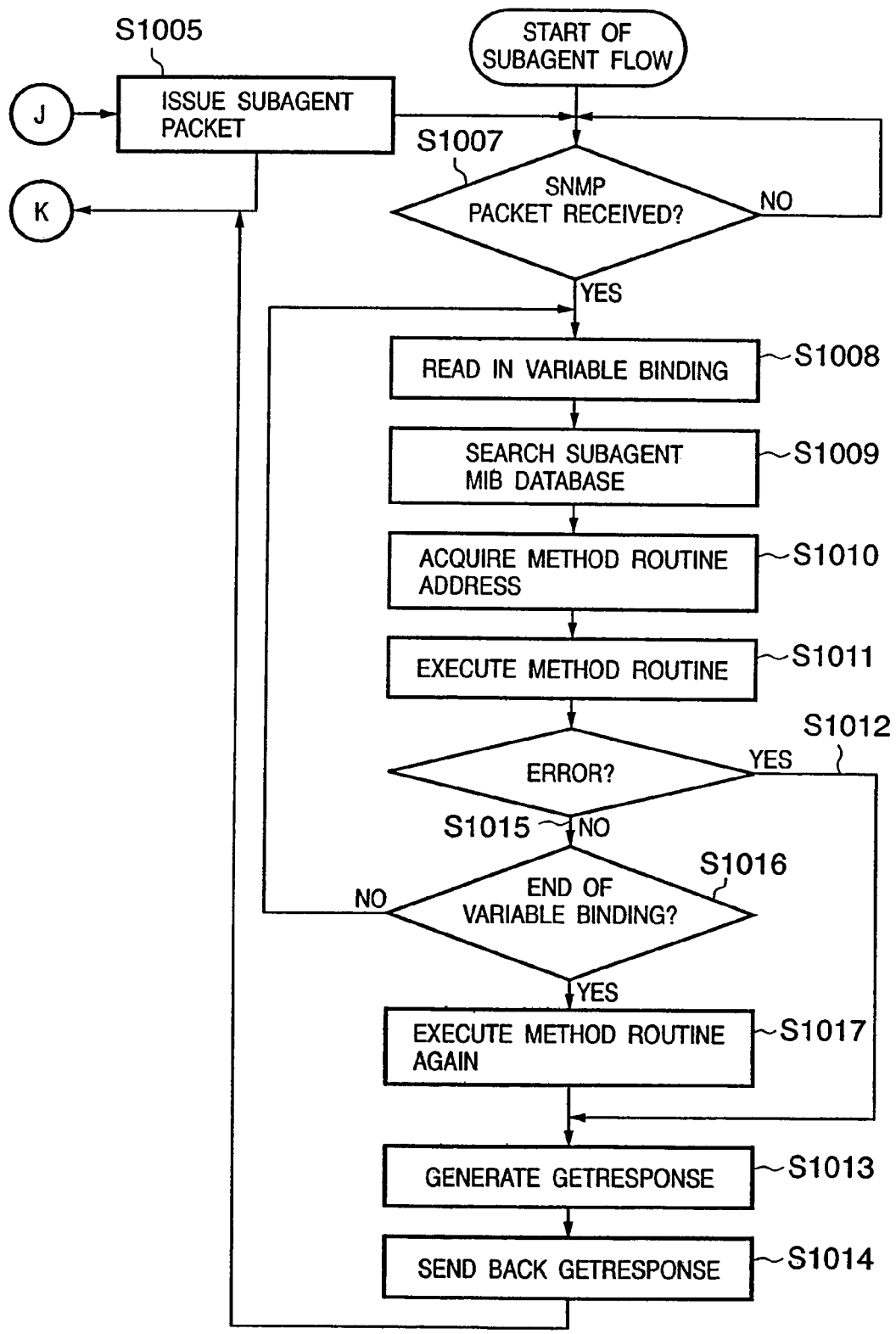

FIGS. 9, 10A and 10B are flowcharts for describing the control flow of a process B in a case where the PDU type is Set Request.

As shown in FIG. 9, the master agent successively reads out variable-and-value combinations in the variable binding of the master-agent SNMP packet (step S901), acquires, through use of the MIB database management unit 207, address information of an address at which a method routine corresponding to a variable has been stored (step S903) and subsequently executes the relevant processing in the method routine controller 208 based upon this address information (step S904). In this case, each method routine evaluates only the validity of each value to be set, and processing for changing the values of each MIB object to specified values is not executed at this time.

If notification of abnormal end is received from the method routine controller 208 after execution of the above-described processing (step S905), processing is suspended without waiting for completion of execution of the overall variable binding, the GetResponse packet generator 210 is notified of the error status and index value and a GetResponse packet is generated. If an error occurs in the process on the side of the master agent, an SNMP packet is not sent to the subagent side.

With regard to the GetResponse packet that has been generated, the value of the error index is converted to a value in the received original packet by the SNMP-packet reconstruction controller 211 (step S1001).

The reconstructed GetResponse packet is subjected to BER encoding in the BER decoder/encoder (step S1002), after which the GetResponse packet is sent back to the SNMP manager by processing executed in the packet send/receive controller (step S1003).

If notification of normal end is received from the method routine controller 208 (step S906), processing identical with that of steps S901 to S904 is applied to the next combination of variable and value. The same processing is executed until the end of the variable binding list is reached (step S907). A GetResponse packet is generated after all processing has been completed (step S908).

FIGS. 10A and 10B are flowcharts illustrating the control flow after generation of a GetResponse packet by the master agent. At the moment generation of the GetResponse packet is completed, the master agent determines whether a packet to be issued to a subagent exists (step S1004). If the decision rendered is "YES", the subagent SNMP packet that was generated at step S506 is issued to the subagent via the subagent I/F controller 209 (step S1005). The master agent then waits from the GetResponse from the subagent (step S1006).

Upon receiving the subagent SNMP packet via the master-agent I/F controller 302 ("YES" at step S1007), the subagent, in a manner similar to the master agent, successively reads out variable-and-value combinations in the variable binding of the subagent SNMP packet (step S1008), searches the MIB database 1081 using the MIB database management unit 304 (step S1009), acquires address information of an address at which a method routine corresponding to a variable has been stored (step S1010) and subsequently executes the relevant processing in the method routine controller 305 based upon this address information (step S1011).

In this case, each method routine evaluates only the validity of each value to be set, and processing for changing the values of each MIB object to specified values is not executed at this time.

If notification of abnormal end is received from the method routine controller 208 after execution of the above-described processing (step S1012), processing is suspended without waiting for completion of execution of the overall variable binding, the GetResponse packet generator 306 is notified of the error status and index value and a GetResponse packet is generated (step S1013). The generated GetResponse packet is reported to the master agent via the master-agent I/F controller 302 (step S1014).

If notification of normal end is received from the method routine controller 305 (step S1015), processing identical with that of steps S1008 to S1011 is applied to the next combination of variable and value. The same processing is then executed until the end of the variable binding list is reached (step S1016). The subagent again successively reads out variable-and-value combinations in the variable binding, acquires, through use of the MIB database management unit 304, address information of an address at which a method routine corresponding to a variable has been stored and subsequently executes the relevant processing in the method routine controller based upon this address information. In this process, the subagent changes the values of each MIB object to specified values (step S1017). Upon completion of this processing, the subagent generates a GetResponse packet in the subagent packet generator 206 (step S1013) and reports this GetResponse packet to the master agent via the master-agent I/F controller 302 (step S1014).

Upon receiving the GetResponse packet from the subagent via the subagent I/F controller 209, the master agent reconstructs the GetResponse packet in the SNMP-packet reconstruction controller 211.

If the error status of a GetResponse packet received from a subagent indicates an error (step S1018), the GetResponse packet is discarded by the SNMP-packet reconstruction controller 211 (step S1019) and the value of the error index in the GetResponse packet sent back from the subagent is converted to a value in the received original packet (step S1001). At this time the variable binding is not included in the GetResponse packet in accordance with the atomic rule.

At the moment conversion processing is completed, BER encoding is performed by the BER decoder/encoder controller (step S1002), after which the GetResponse packet is sent back to the SNMP manager by processing executed in the packet send/receive controller (step S1003).

If the error status of the GetResponse packet received from the subagent is indicative of no error (step S1020), the master agent again successively reads out variable-and-value combinations in the variable binding, acquires, through use of the MIB database management unit 207, address information of an address at which a method routine corresponding to a variable has been stored and subsequently executes the relevant processing in the method routine controller 208 based upon this address information. The master agent in this process changes the values of each MIB object to specified values (step S1021).

At the same time, the variable bindings in the GetResponse packets of the master agent and subagent are rearranged in an order identical with that of the stored original packet and are reconstructed into a single GetResponse packet in the SNMP-packet reconstruction controller 211 (step S1022).

The reconstructed GetResponse packet is subjected to BER encoding in the BER decoder/encoder 203 (step S1002), after which the GetResponse packet is sent back to the SNMP manager by processing executed in the packet send/receive controller 202 (step S1003).

The process B regarding packets for which the PDU type is Set Request is completed through the processing described above, after which the system again waits for receipt of an SNMP packet from the SNMP manager.

As described above, an MIB database is divided into one for a master agent and one for a subagent, the master-agent MIB database is held by a network controller and the subagent MIB data is held by a peripheral device connected to the network controller, whereby memory resources that are necessary to store a network information management database can be distributed. As a result, it is no longer to necessary to provide one agent with a large-capacity memory.

Further, communication of information can be implemented between the master agent and the subagent by using a protocol identical with a communication protocol (SNMP) specified between a network manager and a network-capable image processing device (a printer in this embodiment). As a result, it is unnecessary for the network controller to be equipped with a plurality of protocol control means for the purpose of communication between the network controller and peripheral devices connected thereto. That is, if the master agent described in this embodiment is mounted on a network controller and a peripheral device connected thereto is equipped with a subagent and a database that includes the requisite MIB and a specific MIB, then a network can be managed. Since the content of processing by the subagent is similar to the content of processing by a conventional agent, mounting the subagent is easy. Furthermore, in a case where a peripheral device is added to a network controller anew, the new peripheral device can be made an additional object of management merely by adding on network management information (an MIB database) concerning this peripheral device and the subagent that controls this peripheral device, without modifying the MIB database with which the network controller is equipped.

Other Embodiments

In the first embodiment, a mode in which a printer is adopted as the image processing device (peripheral device) is illustrated. However, the image processing device is not limited to a printer. More specifically, if the device is a scanner, a facsimile machine, a copier or an image processing device having these multiple functions, and if the device is capable of being equipped with the subagent functions described in the first embodiment, then the device can be managed through a procedure similar to that of the first embodiment merely by connecting it to a network controller (NIC) equipped with a master agent.

The first embodiment illustrates an example in which an NIC, namely a network controller, is inserted into an external expansion slot of a printer. However, this does not impose a limitation upon the invention. If the arrangement is one in which a network controller and the controller of a peripheral device are logically independent of each other, the present invention can be implemented even in a case where these controllers are physically constructed of the same hardware or on the same board.

In the first embodiment, a network controller and a printer controller communicate using their own hardware-implemented interfaces. However, no matter what communication means these interfaces use, such as generally employed means exemplified by serial or parallel interfaces or Ethernet, the procedures of FIGS. 5 to 10 can be implemented so long as the communication means is means that can be equipped with the communication protocol described in the first embodiment.

The first embodiment illustrates an example in which a master agent is placed in a network controller and a subagent is disposed in a printer controller. However, an arrangement can be adopted in which the master agent is placed in the printer controller and the subagent is placed in the network controller. In such case a packet that has been transmitted from the SNMP manager to a network device would be delivered to the printer controller as is via the network controller. In such case, therefore, it would be necessary for the network controller to have the functions of the subagent of the first embodiment and a function that allows an SNMP packet to pass between the SNMP manager and printer controller as is.

In the first embodiment, the master agent and subagent have control module structures that differ from each other. However, they can be implemented by exactly the same control structures. In such case the agent that analyzes a request for network management information and sends network management information to the network information manager would function as the master agent, and the other agent would function as a subagent.

The first embodiment illustrates an example in which the invention is implemented by one subagent and one master agent. However, it is possible to adopt an arrangement in which N-number (two or more) of subagents exist with respect to one master agent.

FIG. 11 is a diagram showing an arrangement having one master agent and N-number of subagents.

As shown in FIG. 11, a master agent 1101 separates a subagent SNMP packet and transmits it to a first subagent 1102. If the first subagent 1102 detects in the variable binding of the received packet a variable that is not being managed by the MIB database of the first subagent 1102, then the latter stores the position of this variable and separates the variable from the packet. The deleted variable and its value are separated and constructed as a second subagent SNMP packet in a first subagent packet generator. This packet is transmitted to a second subagent 1103. Similar control is executed from an (N−1)th subagent 1104 to an Nth subagent 1105. The Nth subagent 1105 processes a received request (packet), generates a packet containing the results of this processing and sends the packet back to the (N−1)th subagent 1104. The latter reconstructs a packet, which is to be sent back to the (N−2)th subagent, from a packet containing results of processing executed by its own agent and the packet sent back from the N-th subagent, and sends the reconstructed packet back to the (N−2)th subagent. This control is carried out by each subagent and the master agent 1101. As a result, the master agent can acquire the results of processing by all of the N-number of subagents and by the master agent and can respond to the SNMP manager. Thus, control for responding with network management information can be executed in distributed fashion by N-number (two or more) of subagents.

Thus, messages are caused to flow from an upstream agent to a downstream agent and variables to be processed are successively extracted and processed. Conversely, processed results are caused to flow from downstream to upstream while being successively reconstructed, whereby a message packet received from an SNMP manager is eventually processed and the results can be provided as a response.

In the arrangement of FIG. 11, all of the subagents have the functions of the master agent of the first embodiment. However, since the encoding of transmit packets and the decoding of receive packets are not carried out, these functions are unnecessary. Further, the master agent also has functions similar to those of the first embodiment. Accordingly, the master agent and subagent shown in FIG. 11 differ from each other functionally depending upon whether the encoding of a transmit packet or the decoding of a receive packet is performed.

Further, since the Nth agent does not have an agent downstream, it does not require a packet separating/reconstructing function, though there is no harm is providing it with such a function. The reason for this is that since the SNMP manager keeps track of the MIB that each network device manages by an MIB view, the SNMP manager does not in principle specify a variable name not being managed by a device. If processing is executed correctly, therefore, there should be no unmanaged variables left in the packet received by the Nth agent. Further, if provisions are to be made for a case where a variable not being managed by the Nth agent does remain in a packet, it will suffice to decide on a processing procedure that will give an error indication in a case where there is no transmission destination for the packet.

In such case the first embodiment would take on a form in which the $1^{st}$ to the (N−1)th subagents have been removed from FIG. 11, leaving the master agent and the N-th subagent. Further, the controllers having agents are serially connected, though it is not required that they be electrically and physically serial. If the connection between agents is serial logically, there is no restriction as to the mode of the electrical or physical connection.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software, which is illustrated in FIG. 5 and FIGS. 7 to 10, for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the functions of the embodiments and the storage medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiment.

In a case where the present invention is applied to the above-described storage medium, program code corresponding to the flowcharts (shown in FIG. 5 and in FIGS. 7 to 10) described earlier would be stored on the storage medium.

Thus, in accordance with the present invention as described above, a management information database originally possessed by a network controller can be dispersed among connected peripheral devices. This makes it unnecessary for the network controller to be equipped with a large-capacity memory.

Further, a network controller and a peripheral device connected thereto can communicate information by using a protocol identical with a communication protocol specified between a network information manager and the network controller. It is therefore no longer necessary to provide the network controller with a plurality of protocol control means.

Furthermore, in a case where a peripheral device is added to a network controller anew, the network controller can be updated if the peripheral device is equipped with a subagent for managing its own network management information.

As many apparently widely different embodiments of the present invention can be made without departing from the spirit and scope thereof, it is to be understood that the invention is not limited to the specific embodiments thereof except as defined in the appended claims.

What is claimed is:

1. A network controller for managing a plurality of peripheral devices, and constructed for connection to a communication line, comprising:
  receiving means for receiving a data packet from a management apparatus via the communication line;
  connecting means for connecting the network controller to the plurality of peripheral devices;
  identifying means for identifying a first variable for receipt by the network controller and respective variables with regard to each of the plurality of connected peripheral devices, to be sent to and processed by respective peripheral devices, in the data packet which has been received by said receiving means;

constructing means for constructing a first data packet with the first variable and a second data packet with the respective variables to be processed by the respective peripheral devices of the plurality of connected peripheral devices;

sending means for sending the second data packet with the respective variables to the respective peripheral devices and causing the respective peripheral devices to process the sent data packet;

processing means for processing the first data packet with the first variable; and transmitting means for transmitting a response data to the management apparatus which contains a result of processing the first data packet performed by said processing means, wherein the response data sent by the transmitting means to the management apparatus further contains a result of processing the second data packet performed by the respective peripheral devices to which the second data packet was sent by said sending means.

2. The network controller according to claim 1, further comprising holding means for holding information relating to the network controller, wherein said processing means processes the first data packet using the information held by said holding means.

3. A method of controlling a network controller for managing a plurality of peripheral devices, wherein the network controller is constructed for connection to a communication line, the method comprising:

a receiving step of receiving a data packet from a management apparatus via the communication line;

a connecting step of connecting the network controller to the plurality of peripheral devices;

an identifying step of identifying a first variable for receipt by the network controller and respective variables with regard to each of the plurality of connected peripheral devices, to be sent to and processed by respective peripheral devices, in the data packet which has been received at said receiving step;

a constructing step of constructing a first data packet with the first variable and a second data packet with the respective variables to be processed by the respective peripheral devices of the plurality of connected peripheral devices;

a sending step of sending the second data packet with the respective variables to the respective peripheral devices and causing the respective peripheral devices to process the sent data packet;

a processing step of processing the first data packet with the first variable; and a transmitting step of transmitting a response data to the management apparatus which contains a result of processing the first data packet performed in said processing step, wherein the response data sent in said transmitting step to the management apparatus further contains a result of processing the second data packet performed by the respective peripheral devices to which the second data packet was sent in said sending step.

4. The method according to claim 3, further comprising a holding step of holding information relating to the network controller, wherein said processing step processes the first data packet using the information held at said holding step.

5. A non-transitory computer-readable storage medium storing a computer program for implementing control in a network controller for managing a plurality of peripheral devices, wherein the network controller is constructed for connection to a communication line, said program comprising:

a receiving step of receiving a data packet from a management apparatus via the communication line;

a connecting step of connecting the network controller to the plurality of peripheral devices;

an identifying step of identifying a first variable for receipt by the network controller and respective variables with regard to each of the plurality of connected peripheral devices, to be sent to and processed by respective peripheral devices, in the data packet which has been received at said receiving step;

a constructing step of constructing a first data packet with the first variable and a second data packet with the respective variables to be processed by the respective peripheral devices of the plurality of connected peripheral devices;

a sending step of sending the second data packet with the respective variables to the respective peripheral devices and causing the respective peripheral devices to process the sent data packet;

a processing step of processing the first data packet with the first variable; and a transmitting step of transmitting a response data to the management apparatus which contains a result of processing the first data packet performed in said processing step, wherein the response data sent in said transmitting step to the management apparatus further contains a result of processing the second data packet performed by the respective peripheral devices to which the second data packet was sent in said sending step.

6. The non-transitory computer-readable storage medium according to claim 5, wherein said program further comprises a holding step of holding information relating to the network controller, wherein said processing step processes the first data packet using the information held at said holding step.

7. A network device constructed for connection to a communication line and including a plurality of peripheral processing units and a network controller for managing the plurality of peripheral processing units, wherein said network controller comprises:

first receiving means for receiving a data packet from a management apparatus via the communication line;

connecting means for connecting the network controller to the plurality of peripheral processing units;

identifying means for identifying a first variable for receipt by the network controller and respective variables with regard to each of the plurality of peripheral processing units, to be sent to and processed by respective peripheral processing units, in the data packet which has been received by said first receiving means;

constructing means for constructing a first data packet with the first variable and a second data packet with the respective variables to be processed by the respective peripheral processing units of the plurality of connected peripheral processing units;

sending means for sending the second data packet with the respective variables to the respective peripheral processing units, and for causing said respective peripheral processing units to process the sent data packet;

first processing means for processing the first data packet with the first variable; and transmitting means for transmitting a response data to the management apparatus which contains a result of processing the first data packet performed by said first processing means, wherein the response data sent by the transmitting means to the management apparatus further contains a result of processing the second data packet performed by the respective peripheral processing units unit to which the second data packet was sent by said sending means, and wherein each peripheral processing unit comprises:

a second receiving means for receiving the second data packet with the respective variables constructed by the constructing means; and a second processing means for processing the second data packet, which has been received by said respective receiving means, upon referring to a database holding information relating to the respective peripheral processing unit.

8. The network device according to claim 7, further comprising holding means for holding information relating to the network controller, wherein said first processing means processes the first data packet using the information held by said holding means.

\* \* \* \* \*